United States Patent [19]

Inaho

[11] Patent Number: 5,884,019
[45] Date of Patent: Mar. 16, 1999

[54] SYSTEM AND METHOD FOR COLLECTING DUMP INFORMATION IN A MULTI-PROCESSOR DATA PROCESSING SYSTEM

[75] Inventor: Osamu Inaho, Kawasaki, Japan

[73] Assignee: Fujitsu Limited, Kawasaki, Japan

[21] Appl. No.: 623,995

[22] Filed: Mar. 29, 1996

[30] Foreign Application Priority Data

Aug. 7, 1995 [JP] Japan .................................. 7-200154

[51] Int. Cl.$^6$ .................................................. G06F 11/00
[52] U.S. Cl. ................. 395/182.04; 395/182.11
[58] Field of Search ................ 395/182.04, 182.09, 395/182.11, 182.12, 182.13, 672; 711/100

[56] References Cited

U.S. PATENT DOCUMENTS

| 5,235,700 | 8/1993 | Alaiwan et al. | 395/182.11 |
| 5,634,096 | 5/1997 | Baylor et al. | 395/182.04 |

OTHER PUBLICATIONS

Patent Abstracts of Japan No. 3–240842.
English language Abstract and Japanese patent application laid–open publication No. 2–27449, issued Jan. 30, 1990.
English language Abstract and Japanese patent application laid–open publication No. 4–107649, issued Apr. 9, 1992.

*Primary Examiner*—Majid A. Banankhah
*Attorney, Agent, or Firm*—Staas & Halsey

[57] ABSTRACT

A system and method for collecting dump information in a system having a plurality of computation processors to execute a parallel processing program, which minimizes a down time of the system due to a dump collection. The plurality of computation processors are interconnected via a network for executing the parallel processing program. When one of the computation processors has failed, abort operation means aborts the computation processors. Dump writing means writes dumps of the computation processors excluding the failed computation processor into an internal storage unit of the failed computation processor. After the dump writing means has finished writing the dumps, restarting means restarts the computation processors excluding the failed computation processor. Reading means transfers the dumps written in the failed computation processor and a dump of the failed computation processor to an external storage unit.

11 Claims, 5 Drawing Sheets

SYSTEM AND METHOD FOR COLLECTING DUMP INFORMATION IN A MULTI-PROCESSOR DATA PROCESSING SYSTEM

BACKGROUND OF THE INVENTION

1. Field of the Invention

The present invention relates to a system for and method of collecting dump information in a data processing system in which a plurality of computation processors execute a parallel processing program, and more specifically, to a system for and method of collecting a plurality of dumps in a parallel computer system with distributed memory architecture.

2. Description of the Related Art

Stand-alone computer systems generally collect a memory dump of their main storage or secondary storage when they have gone down, and output it to external storage for troubleshooting of their operating system.

In contrast to the stand-alone systems, parallel computer systems with distributed memory architecture have a plurality of computation processors interconnected with a network, where each computation processor incorporates an independent CPU and memory to perform a concurrent computation under the control of a common parallel processing program, making data transfer and synchronization via the network. The above-described dump collection in the case of a system failure is carried out also in such parallel computer systems.

Take a conventional computer system organized by multiple computation processors, for instance, and assume that some of the computation processors are executing a common parallel processing program. If a failure is detected in one of such processors, all the processors executing the parallel processing program will be aborted in the middle of their operation. Subsequently, the dumps of those computation processors will be collected and outputted as files to be stored in an external storage unit.

Among those computation processors that have offered their dumps, the computation processors other than the failed one are then restarted after the completion of the dump collection, because they must have no problem.

In the above-described situation, there arises a quite reasonable demand that the system down time (i.e., a period of time from abort to restart) due to a trouble be minimized.

Unfortunately, however, it generally takes a long time to finish writing the dumps from the computation processors into the external storage unit. Furthermore, increasing memory consumption in modern computation processors makes the time necessary for writing the dumps longer and longer. The total system down time also increases in proportion to the number of computation processors subject to the dump collection.

All those things are serious disadvantages to the users, and therefore, it is essential to reduce the system down time as much as possible.

SUMMARY OF THE INVENTION

Taking the above into consideration, an object of the present invention is to provide a system for and method of collecting dump information in a system having a plurality of computation processors to execute a parallel processing program, which minimizes a down time of the system due to a dump collection.

To accomplish the above object, according to the present invention, there is provided a system for collecting dump information in a system having a plurality of computation processors to execute a parallel processing program. The system comprises abort operation means for aborting the computation processors when one of the computation processors has failed while executing the parallel processing program, and dump writing means for writing dumps of the respective computation processors excluding the failed computation processor into an internal storage unit of the failed computation processor.

To accomplish the above object, there is also provided a method of collecting dump information by a control processor servicing in a data processing system in which a plurality of computation processors execute a parallel processing program. The method comprises the following steps of: (a) aborting the computation processors when one of the computation processors has failed while executing the parallel processing program; (b) delivering a dump collection program to the computation processors; (c) writing dumps of the computation processors excluding the failed computation processor into an internal storage unit of the failed computation processor by using the dump collection program that is delivered; (d) restarting the computation processors excluding the failed computation processor after the dumps have been written in said step (c); and (e) reading the dumps written in the failed computation processor and a dump of the failed computation processor into an external storage unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
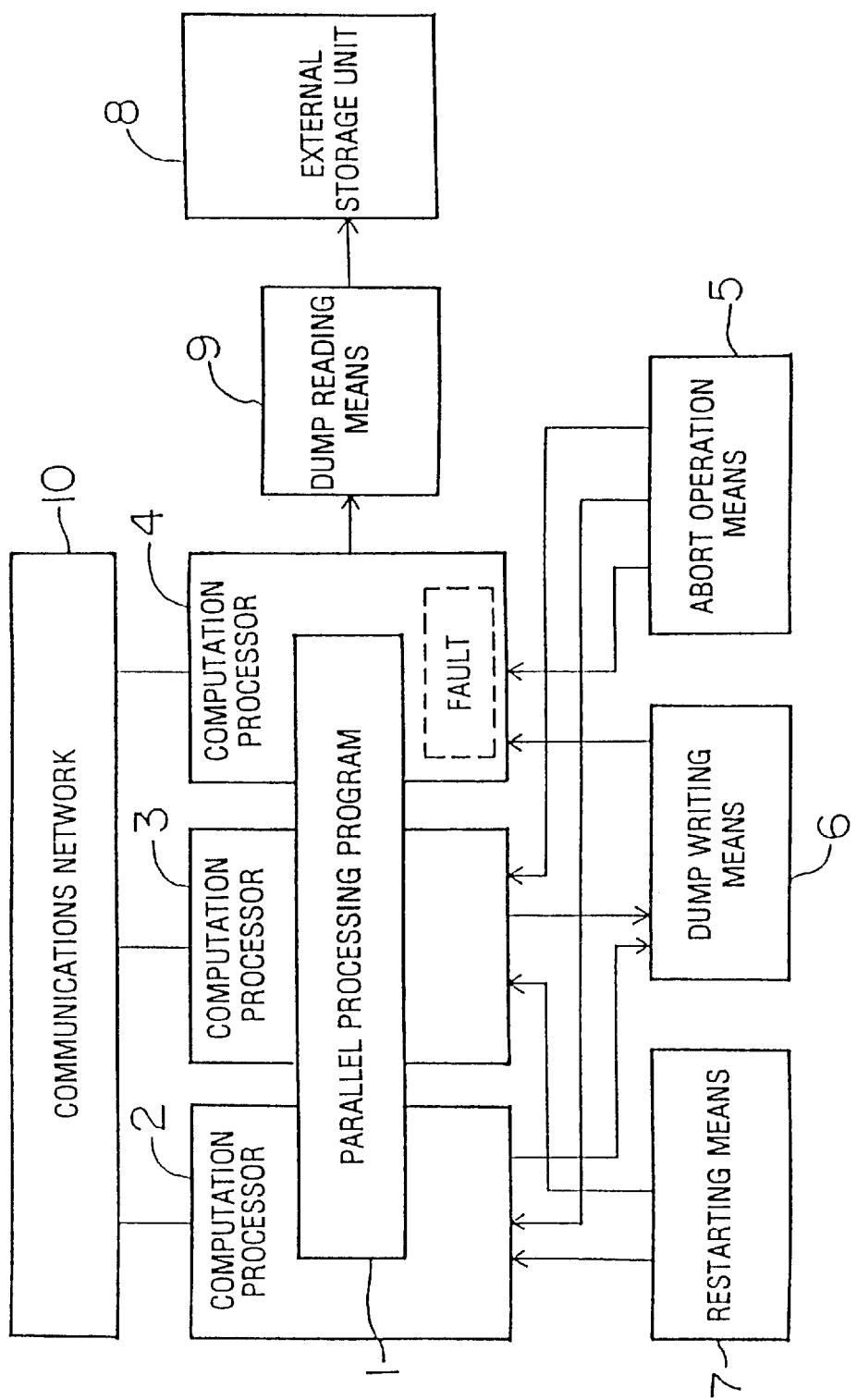
FIG. 1 is a conceptual view of the present invention.

Two embodiments of the present invention will be described below with reference to the drawings.

At the outset, the principle of a first embodiment of the present invention will be explained below with reference to FIG. 1.

In the first embodiment, the system comprises abort operation means 5 for aborting a plurality of computation processors 2–4 when any one of the computation processors 2–4 (say, the computation processor 4) has failed while executing a parallel processing program 1, and dump writing means 6 for writing dumps of the computation processors 2 and 3, which remain when excluding the failed computation processor 4 from the computing processors 2–4, into an internal storage unit in the failed computation processor 4. The system further comprises restarting means 7 for restarting the computation processors 2 and 3, which remain when excluding the failed computation processor 4 from the computing processors 2–4, after completion of the dump writing operation by the dump writing means 6, and dump reading means 9 for reading the dumps of the other computation processors written in the failed computation processor 4 and a dump of the failed computation processor 4 into an external storage unit 8.

Figures 2A, 2B, 2C:
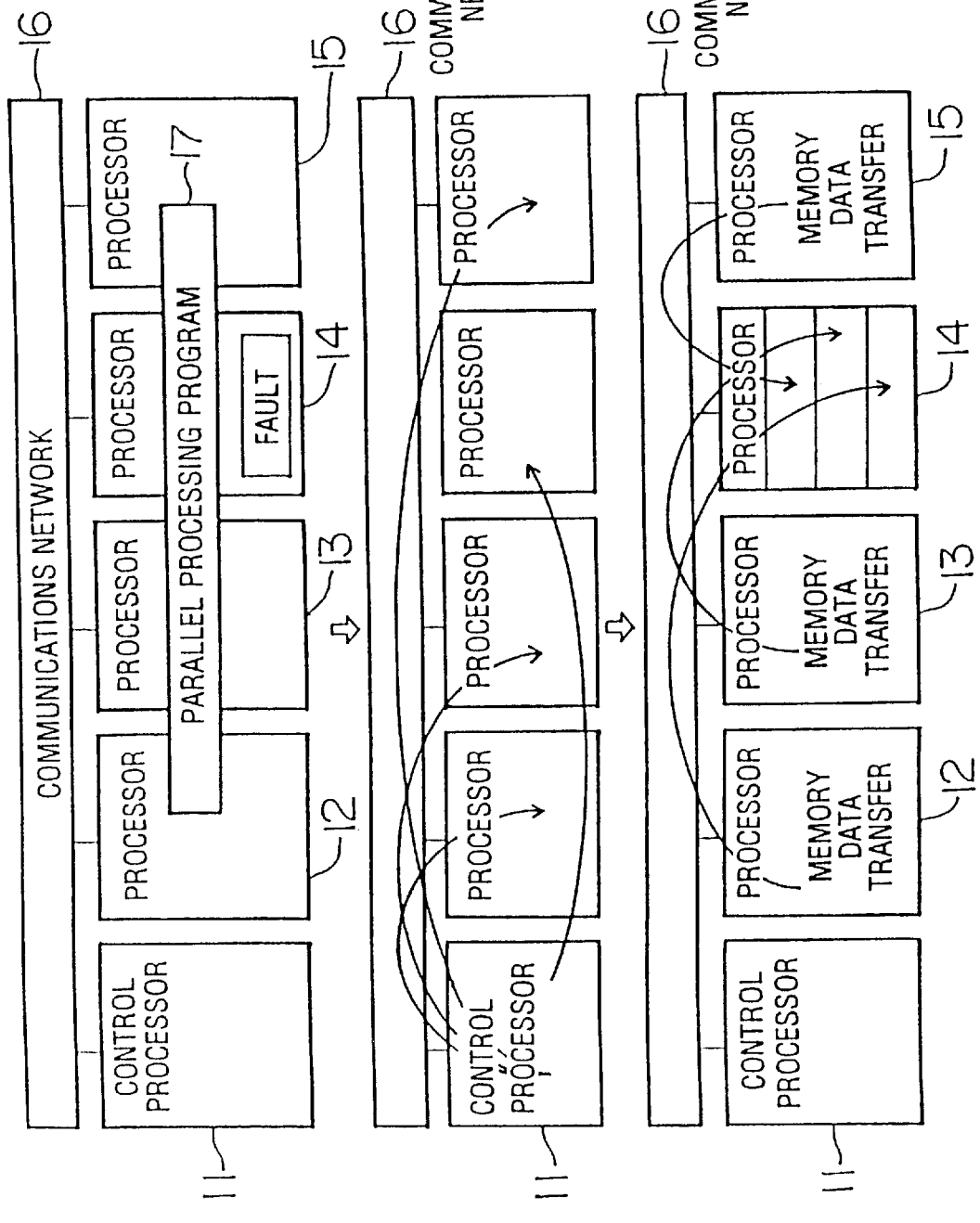
FIG. 2(A) is a diagram showing a specific structure of a first embodiment of the present invention.
FIG. 2(B) is a diagram showing how a dump driver is transferred from a control processor to other processors in the first embodiment.
FIG. 2(C) is a diagram showing how the processors write their dumps into a failed processor in the first embodiment.

FIG. 2(A) shows a specific structure of the first embodiment. A control processor 11 and processors 12–15 are interconnected with a communications network 16. The processors 12–15, each of which contains its own internal storage unit and CPU, execute a parallel processing program 17, exchanging data and making a synchronization with each other through the communications network 16. The internal storage unit in each processor stores a system program (operating system) and user programs (application programs). When a trouble has happened somewhere in the system, information in the respective internal storage units of the processors 12–15 should be dumped out and collected for investigation of the cause of the system failure. Such information collected for troubleshooting purposes is called a "dump" and acquisition of the dump information related to the system program execution is especially required.

The control processor 11 in FIG. 2(A) functions as the abort operation means 5, restarting means 7, and dump reading means 9 in FIG. 1. The processors 12–15 provide the function of the dump writing means 6 in FIG. 1 by executing a dump driver (or a dump collection program) delivered from the control processor 11.

The computation processors 2–4 in FIG. 1 corresponds to the processors 12–15 in FIG. 2(A), and similarly, the parallel processing program 1 to the parallel processing program 17 and the communications network 10 to the communications network 16.

FIG. 2(B) illustrates how the dump driver is transferred from the control processor 11 to the processors 12–15 when the processor 14 has failed, and FIG. 2(C) shows how the processors 12, 13, and 15 write their dumps into the internal storage unit of the failed processor 14. Those functions of the control processor 11 to collect the dumps will be described in detail with reference to FIG. 3.

Figure 3:
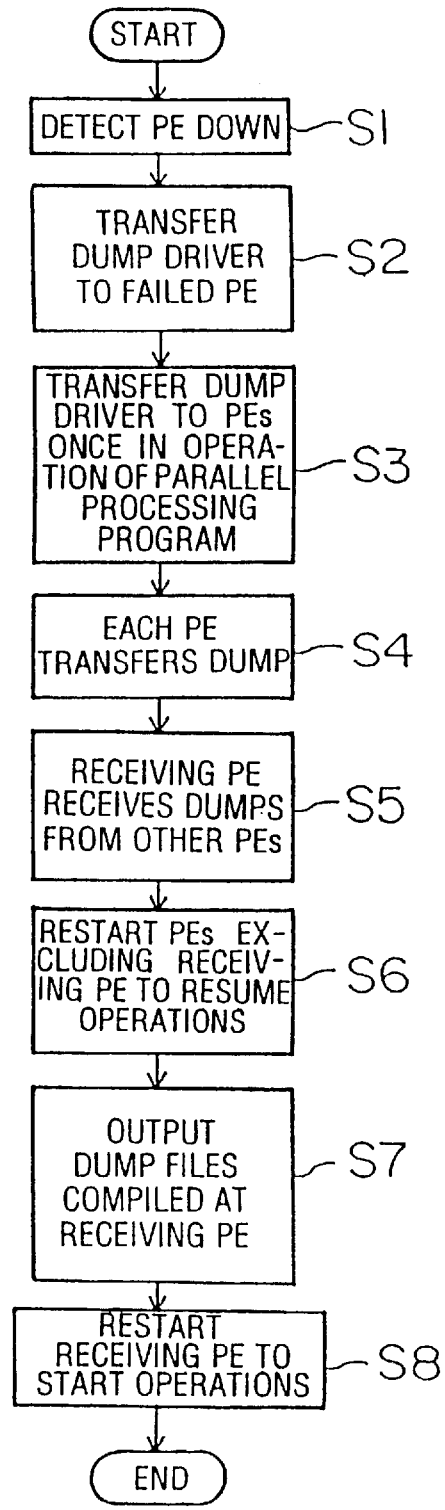
FIG. 3 is a flowchart showing an operational procedure in the first embodiment.

FIG. 3 is a flowchart showing a dump collection procedure executed by the control processor 11. The following explanation will proceed in accordance with the steps shown in the flowchart.

[Step S1] The control processor 11 is monitoring the processors 12–15 to detect their fault. If any fault is detected, the control processor 11 will abort the processors 12–15 which have been executing the parallel processing program 17. The term "PE" used in the flowchart stands for "processing element" denoting the "processor" in this description. It is assumed hereafter that the processor 14 has failed.

[Step S2] The control processor 11 delivers the dump driver to the failed processor 14, which driver is a program to produce a dump and move it to a predetermined memory area.

[Step S3] The control processor 11 delivers the dump driver to the processors 12, 13, and 15, excluding the failed processor 14.

[Step S4] By executing the delivered dump driver, the processors 12, 13, and 15 read out their own dumps and send them to the failed processor 14. The dumps produced here are actually a memory dumps obtained from scalar memory areas of the internal storage units of the processors 12, 13, and 15, whose contents are related to the operating system.

[Step S5] The failed processor 14 writes the received dumps to its local internal storage by executing the dump driver. Specifically, those dumps are written in vector memory areas that have been used for execution of user programs. The term "RECEIVING PE" seen in FIG. 3 denotes the processor element that receives the dumps, which actually is the failed processor 14 in FIGS. 2(A)–2(C).

Note here that the time required for collecting the dumps can be minimized by gathering them up at the failed processor 14 since the failed processor 14 itself produces the largest amount of dump data among the processors in the system.

[Step S6] After the dumps are completely transferred to the failed processor 14, the control processor 11 directs the processors 12, 13, and 15 (i.e., the processors excluding the failed processor 14) to execute an initial program loader (IPL) so as to restart their operations.

[Step S7] The control processor 11 then reads out the dumps stored in the failed processor 14, which include the dump of the processor 14 itself, and writes them into the external storage as data files. Those data files will be used for troubleshooting later on.

[Step S8] The control processor 11 finally directs the failed processor 14 to execute its IPL program to restart operations.

Next, a second embodiment of the present invention will be described below.

Figures 4A, 4B:
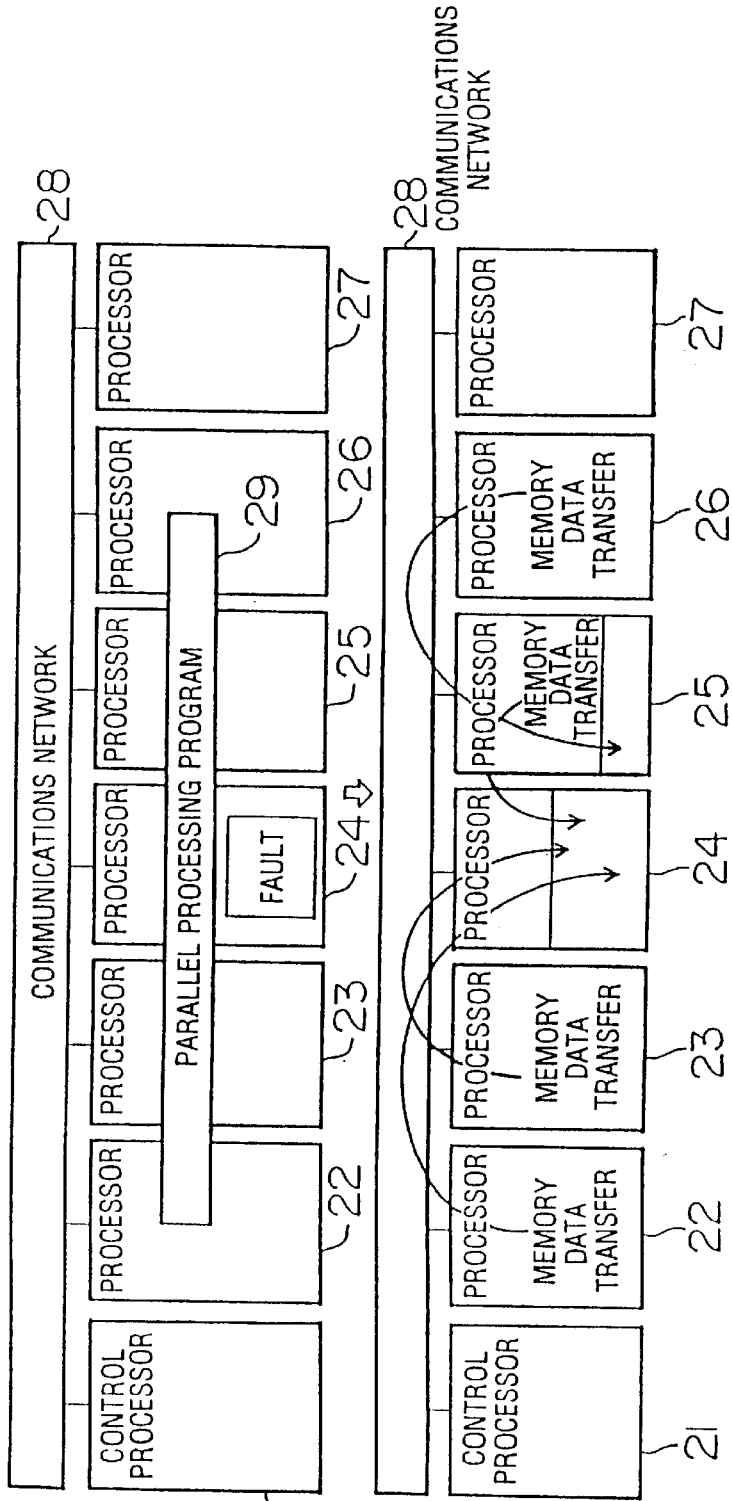
FIG. 4(A) is a diagram showing a specific structure of a second embodiment of the present invention.
FIG. 4(B) is a diagram showing how the processors write their dumps into a failed processor in the second embodiment.

FIG. 4(A) shows a specific structure of the second embodiment, which is configured under the same basic concept shown in FIG. 1. A control processor 21 in FIG. 4(A) serves as the abort operation means 5, restarting means 7, and dump reading means 9 in FIG. 1. Processors 22–27 provide the function of the dump writing means 6 in FIG. 1 by executing a dump driver (or a dump collection program) received from the control processor 21 shown in FIG. 4(A).

The computation processors 2–4 in FIG. 1 corresponds to the processors 22–27 in FIG. 4(A), and similarly, the parallel processing program 1 to a parallel processing program 29 and the communications network 10 to a communications network 28. FIG. 4(A) illustrates a situation that the processors 22–26 are executing the parallel processing program 29 but the processor 27 is not.

Figure 5:
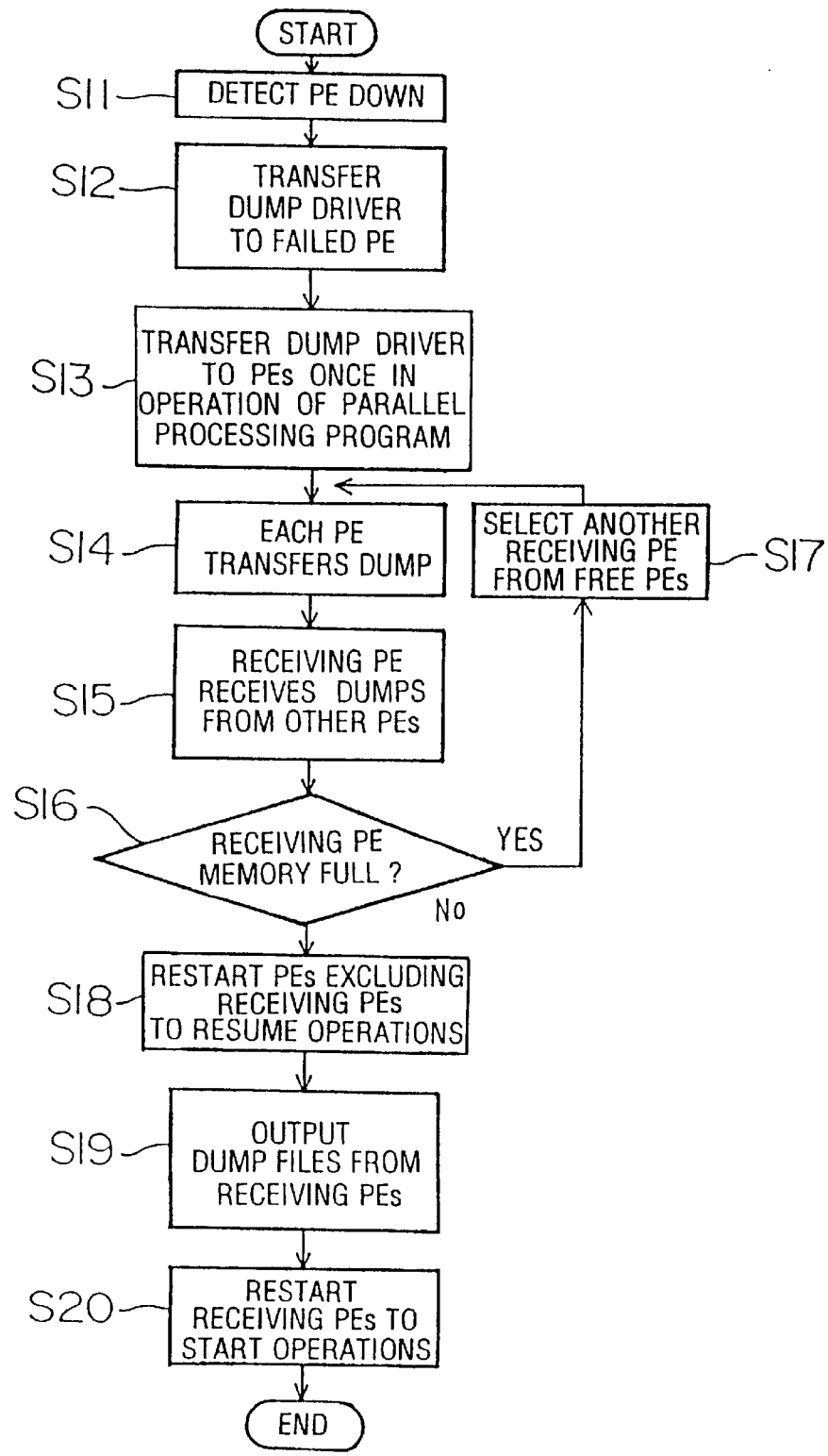
FIG. 5 is a flowchart showing an operational procedure in the second embodiment.

FIG. 4(B) shows how the processors 22, 23, 25, and 26 write their dumps into the internal storage unit of the failed processor 24. In contrast to the first embodiment, the second embodiment provides a system capable of dealing with the case that the dump data is too enormous to store them all in the internal storage unit of the failed processor 24. With reference to FIG. 5, the following description will now present another way of collecting the dumps by the control processor 21.

FIG. 5 is a flowchart showing a dump collection procedure executed by the control processor 21. Since this flowchart has basically the same contents as FIG. 3 for the first embodiment, the following description will focus on its distinctive steps S16 and S17. Steps S11–S15 in FIG. 5 correspond to steps S1–S5 in FIG. 3, and S18–S20 to S6–S8.

[Step S16] When a fault is detected in the processor 24 among the processors 22–26 that have been executing the parallel processing program 29, the dumps of the processors 22, 23, 25, and 26 are written into (or compiled at) the processor 24. In step S16, it is decided whether or not the internal storage unit of the failed processor 24 has been full with the dump data. If it is found that the internal storage unit is not full and all the transferred dumps have been successfully stored in the failed processor 24, then the process advances to step S18. If it is full and cannot accept all the dump data, the process goes to step S17.

[Step S17] The control processor 21 decides which processor should receive the dumps that remain unaccepted. With a system supervisory program, the control processor 21 automatically makes this decision. Returning to FIG. 4(B), for example, the processors 25 and 26 located on the right hand of the failed processor 24 and the processors 22 and 23 on the left hand are sequentially examined by the control processor 21 whether they have finished transferring the dump to the failed processor 24 or not. If there are some processors that have already finished transferring their dumps, the control processor 21 appoints the first-found processor to receive the remaining dumps. In the case of FIG. 4(B), the processor 25 is appointed to serve as the receiver.

Consequently, in the further steps S14 and S15 that follow step S17, the remaining dumps are written into the processor 25 instead of the processor 24. In step S18, the processors 22, 23, and 26 are restarted, and in step S19, the dumps collected in the processors 24 and 25 are outputted to the external storage (not shown).

In the way described above, when the total amount of the dump data is too enormous for the internal storage unit in the failed processor 24 to accept all of the damps, the second embodiment uniquely nominates one processor among those ones which have finished the dump transfer and directs the nominated processor to store the dumps that remain unaccepted.

The above-described present invention will be summarized below. When a fault has occurred in a processor among a plurality of processors executing a parallel processing program, the dumps are collected at the failed processor from the other processors related thereto, and after that, the other processors restart their operations. This structural arrangement allows the system down time due to the dump collection process to be shorter than those in conventional systems in which each processor should output its dump directly to external storage. The present invention thus minimizes disadvantages that users may suffer as a result of the trouble and improves the reliability of the system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for collecting dump information in a data processing system in which a plurality of computation processors execute a parallel processing program, comprising:

abort operation means for aborting the computation processors when one of the computation processors has failed while executing the parallel processing program; and dump writing means for writing dumps of the computation processors excluding the failed computation processor into an internal storage unit of the failed computation processor.

2. A system according to claim 1, further comprising restarting means for restarting the computation processors excluding the failed computation processor after said dump writing means has finished writing the dumps.

3. A system according to claim 1, further comprising dump reading means for reading the dumps written in the failed computation processor and a dump of the failed computation processor into an external storage unit.

4. A system according to claim 3, further comprising restarting means for restarting the failed computation processor after said dump reading means has finished reading the dumps.

5. A system according to claim 1, further comprising:

restarting means for restarting the computation processors excluding the failed computation processor after said dump writing means has finished writing the dumps; and dump reading means for reading the dumps written in the failed computation processor and a dump of the failed computation processor into an external storage unit, wherein, in case that the internal storage unit of the failed computation processor is unable to accept all the dumps of the computation processors excluding the failed computation processor, said dump writing means writes remaining dumps that remain unaccepted by the failed computation processor into an internal storage unit in another computation processor selected from the computation processors whose dumps have been accepted by the failed computation processor, said restarting means restarts the computation processors excluding the failed computation processor and the selected computation processor, and said dump reading means reads the dumps written in the failed computation processor, the dumps written in the selected computation processor, and the dump of the failed computation processor into the external storage unit.

6. A system according to claim 1, wherein the dumps written by said dump writing means are memory dumps related to an operating system.

7. A method of collecting dump information by a control processor servicing in a data processing system in which a plurality of computation processors execute a parallel processing program, comprising the steps of:

(a) aborting the computation processors when one of the computation processors has failed while executing the parallel processing program;

(b) delivering a dump collection program to the computation processors;

(c) writing dumps of the computation processors excluding the failed computation processor into an internal storage unit of the failed computation processor by using said dump collection program that is delivered;

(d) restarting the computation processors excluding the failed computation processor after completion of said step (c); and (e) reading the dumps written in the failed computation processor and a dump of the failed computation processor into an external storage unit.

8. A method according to claim 7, further comprising the step of (f) restarting the failed computation processor after completion of said step (e).

9. A method according to claim 7, wherein in case that the internal storage unit of the failed computation processor is unable to accept all of the dumps of the computation processors excluding the failed computation processor, said step (c) writes remaining dumps that remain unaccepted by the failed computation processor into an internal storage unit in another computation processor selected from the computation processors whose dumps have been accepted by the failed computation processor, said step (d) restarts the computation processors excluding the failed computation processor and the selected computation processor, and said step (e) reads the dumps written in the failed computation processor, the dumps written in the selected computation processor, and the dump of the failed computation processor into the external storage unit.

10. A system for collecting dump information in a data processing system in which a plurality of computation processors execute a parallel processing program, comprising:

an abort operation device aborting the computation processors when one of the computation processors has failed while executing the parallel processing program; and a dump writing device writing dumps of the computation processors excluding the failed computation processor into an internal storage unit of the failed computation processor.

11. A method of collecting dump information in a system having a plurality of processors, comprising the steps of:

aborting computation of the processors when one of the processors has failed while executing a parallel processing program; and writing dumps of the processors, excluding the failed processor, into an internal storage unit of the failed processor by using a dump collection program that is delivered to the processors.

* * * * *